United States Patent
Nose

(10) Patent No.: US 8,497,843 B2
(45) Date of Patent: Jul. 30, 2013

(54) CONTROLLER DRIVER, DISPLAY DEVICE, AND CONTROL METHOD THEREFOR

(75) Inventor: Takashi Nose, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 448 days.

(21) Appl. No.: 12/654,835

(22) Filed: Jan. 6, 2010

(65) Prior Publication Data

US 2010/0182261 A1   Jul. 22, 2010

(30) Foreign Application Priority Data

Jan. 19, 2009   (JP) ................................ 2009-008419

(51) Int. Cl.
*G06F 3/041* (2006.01)

(52) U.S. Cl.
USPC .......................................... 345/173; 345/174

(58) Field of Classification Search
USPC ...................... 345/173, 174, 179, 213; 463/25
See application file for complete search history.

(56) References Cited

U.S. PATENT DOCUMENTS

| | | | | |
|---|---|---|---|---|
| 6,298,370 | B1 * | 10/2001 | Tang et al. | 718/102 |
| 7,298,905 | B2 * | 11/2007 | Kondo et al. | 382/190 |
| 7,489,306 | B2 | 2/2009 | Kolmykov-Zotov et al. | |
| 7,633,487 | B2 | 12/2009 | Azami et al. | |
| 2006/0074405 | A1 * | 4/2006 | Malackowski et al. | 606/1 |
| 2006/0262100 | A1 * | 11/2006 | Van Berkel | 345/173 |
| 2007/0046596 | A1 * | 3/2007 | Sakakibara et al. | 345/87 |
| 2009/0048014 | A1 * | 2/2009 | Palmisano | 463/25 |

FOREIGN PATENT DOCUMENTS

| | | |
|---|---|---|
| CN | 1494801 A | 5/2004 |
| CN | 1804774 A | 7/2006 |
| CN | 1913603 A | 2/2007 |
| JP | 61-047984 A | 3/1986 |
| JP | 4-360191 | 12/1992 |
| JP | 8-297543 A | 11/1996 |

OTHER PUBLICATIONS

Notice for Reasons for Rejection dated Sep. 25, 2012, with partial English-language translation.
Chinese Office Action dated Aug. 21, 2012, with English-language translation.
Notification of the Second Office Action (China) dated Apr. 27, 2013 with English translation.

* cited by examiner

*Primary Examiner* — Quan-Zhen Wang
*Assistant Examiner* — Calvin C Ma
(74) *Attorney, Agent, or Firm* — McGinn Intellectual Property Law Group

(57) ABSTRACT

A controller driver according to an exemplary embodiment of the present invention includes: a display memory that stores image data to be displayed on a display panel; a touch panel control circuit that detects a touch panel signal from the touch panel; a cursor memory that stores cursor image data; and a composition processing circuit that combines the cursor image data stored in the cursor memory with the image data stored in the display memory based on the touch panel signal, to generate composite image data.

19 Claims, 18 Drawing Sheets

| Dcursur [0,0] | α [0,0] | Dcursur [0,1] | α [0,1] | Dcursur [0,2] | α [0,2] | ----- | Dcursur [0,Xmax-1] | α [0,Xmax] |
|---|---|---|---|---|---|---|---|---|
| Dcursur [1,0] | α [1,0] | Dcursur [1,1] | α [1,1] | Dcursur [1,2] | α [1,2] | ----- | Dcursur [1,Xmax-1] | α [1,Xmax] |
| : | : | : | : | : | : | ----- | : | : |
| Dcursur [Ymax,0] | α [Ymax,0] | Dcursur [Ymax,1] | α [Ymax,1] | Dcursur [Ymax,2] | α [Ymax,2] | ----- | Dcursur [Ymax,Xmax-1] | α [Ymax,Xmax] |

Fig. 5

| Dclick [0, 0] | α1 [0, 0] | Dclick [0, 1] | α1 [0, 1] | Dclick [0, 2] | α1 [0, 2] | ---- | Dclick [0, CXmax−1] | α1 [0, CXmax] |
|---|---|---|---|---|---|---|---|---|
| Dclick [1, 0] | α1 [1, 0] | Dclick [1, 1] | α1 [0, 1] | Dclick [1, 2] | α1 [1, 2] | ---- | Dclick [1, CXmax−1] | α1 [1, CXmax] |
| ---- | ---- | ---- | ---- | ---- | ---- | ---- | ---- | ---- |
| Dclick [CYmax, 0] | α1 [CYmax, 0] | Dclick [CYmax, 1] | α1 [CYmax, 1] | Dclick [CYmax, 2] | α1 [CYmax, 2] | ---- | Dclick [CYmax, CXmax−1] | α1 [CYmax, CXmax] |

Fig. 9

TOUCH PANEL INFORMATION SIGNAL

| CLICK INFORMATION | POSITION COORDINATE SIGNAL: Yt | POSITION COORDINATE SIGNAL: Xt |
|---|---|---|

Fig. 10

CLICK OPERATION REGISTER

| CLICK OPERATION HOLDING TIME : Tcset | ENLARGEMENT RATIO: S | $\alpha$ CHANGE RATIO: $\alpha$plus | ENLARGEMENT CHANGE RATIO: Splus |
|---|---|---|---|

Fig. 11

CONTROLLER DRIVER, DISPLAY DEVICE, AND CONTROL METHOD THEREFOR

BACKGROUND

1. Field of the Invention

The present invention relates to a controller driver, a display device, and a control method therefor. In particular, the present invention relates to a controller driver incorporating a touch panel controller, a display device including a touch panel using the same, and a control method for the display device.

2. Description of Related Art

In recent years, products equipped with touch panels capable of inputting external information through a display screen have been developed in the field of mobile devices such as PDAs and cellular phones. FIG. 17 shows a schematic system configuration of a cellular phone according to a related art. As shown in FIG. 17, a display block 1 includes a display panel 10 and a touch panel 11, and a cellular phone main-body block 2 includes a CPU 20 and a touch panel controller 21. Note that if the display panel 10 is an LCD, a backlight is separately provided in the display block, and the backlight, the display panel, and the touch panel are stacked in this order.

The touch panel 11 is connected to the touch panel controller 21 through an FPC 13. The touch panel controller 21 controls the touch panel 11 based on a touch panel control signal, and acquires a touch panel signal when an external input is applied to the touch panel 11. The touch panel controller 21 converts the acquired touch panel signal into a position coordinate signal (Yt, Xt) and transfers the position coordinate signal to the CPU 20. The display panel 10 is connected to the CPU 20 through an FPC 12. The display panel 10 is driven by a controller driver 3. The controller driver 3 is controlled in accordance with image data Din and a control signal which are received from the CPU 20.

FIG. 18 shows the configuration of the controller driver 3 according to the related art. The controller driver 3 incorporates a display memory 31 in order to reduce power consumption. In the case of still image display, image data stored in the display memory 31 is read out and displayed, thereby reducing power consumption associated with the transfer of image data between the CPU 20 and the controller driver 3.

Meanwhile, when an external input is applied to the touch panel 11 as shown in FIG. 19, the CPU 20 needs to perform processing for generating a cursor data image based on the position coordinate signal (Yt, Xt) and for combining image data 1 and a cursor image which are currently displayed. The CPU 20 also needs to transfer the composite image data Din, which is obtained by combining the image data 1 and the cursor image, to the controller driver. This causes problems such as an increase in CPU processing load and an increase in power consumption.

In view of this, Japanese Unexamined Patent Application Publication No. 04-360191 (Ooya) proposes an input device in which a liquid crystal panel and a touch panel are stacked in this order on a display device in order to reduce the CPU processing load. In the input device disclosed by Ooya, a cursor is displayed on the liquid crystal panel based on touch position information from the touch panel. An operator can visually recognize an image displayed on the display device through the liquid crystal panel, and can also recognize the image and the cursor. This eliminates the need for the CPU to generate composite image data by combining the image data and the cursor image, which are to be displayed on the display device, even while the touch panel is being operated.

SUMMARY

The present inventor has found a problem that the input device disclosed by Ooya includes a liquid crystal panel stacked on a display device, which results in a reduction in transmissivity and an increase in costs.

Thus, there is a demand for reducing the CPU processing load and power consumption without causing a deterioration in display quality and an increase in costs.

A first exemplary aspect of the present invention is a controller driver that controls a display panel and a touch panel disposed on the display panel, the controller driver including: a display memory that stores image data to be displayed on the display panel; a touch panel control circuit that detects a touch panel signal from the touch panel; a cursor memory that stores cursor image data; and a composition circuit that combines the cursor image data stored in the cursor memory with the image data stored in the display memory based on the touch panel signal, to generate composite image data. With this configuration, the controller driver can output the image data, which is obtained by combining the image data stored in the display memory with the cursor image data, to the display panel. Thus, even when an external input is applied to the touch panel, it is not necessary for the CPU to generate composite image data. This results in a reduction in the CPU processing load. Moreover, power consumption associated with the transfer of image data from the CPU to the controller driver can be reduced.

A second exemplary aspect of the present invention is a control method for controlling a display panel and a touch panel disposed on the display panel, the control method including: storing image data to be displayed on the display panel into a display memory; detecting a touch panel signal from the touch panel; combining one of cursor image data and click image data with the image data stored in the display memory based on the touch panel signal, to generate composite image data; and outputting the composite image data to the display panel. With this control method, the controller driver can output the image data, which is obtained by combining the image data stored in the display memory with the cursor image data, to the display panel. Thus, even when an external input is applied to the touch panel, it is not necessary for the CPU to generate composite image data. This results in a reduction in the CPU processing load. Moreover, power consumption associated with the transfer of image data from the CPU to the controller driver can be reduced.

According to exemplary aspects of the present invention, it is possible to provide a controller driver and a display device that are capable of reducing the CPU processing load and power consumption.

BRIEF DESCRIPTION OF THE DRAWINGS

The above and other exemplary aspects, advantages and features will be more apparent from the following description of certain exemplary embodiments taken in conjunction with the accompanying drawings, in which:

FIG. 5 is a table showing examples of cursor image data (Dcursur) and image combining ratio data (α) which are stored in a cursor memory according to the first exemplary embodiment;

FIG. 9 is a table showing examples of click image data (Dclick) and image combining ratio data (α1) which are stored in a click memory according to the second exemplary embodiment;

FIG. 10 is a diagram showing an example of a touch panel information signal according to the second exemplary embodiment;

FIG. 11 is a diagram showing an example of data stored in a click operation register according to the second exemplary embodiment;

DETAILED DESCRIPTION OF THE EXEMPLARY EMBODIMENTS

[First Exemplary Embodiment]

Figure 1:
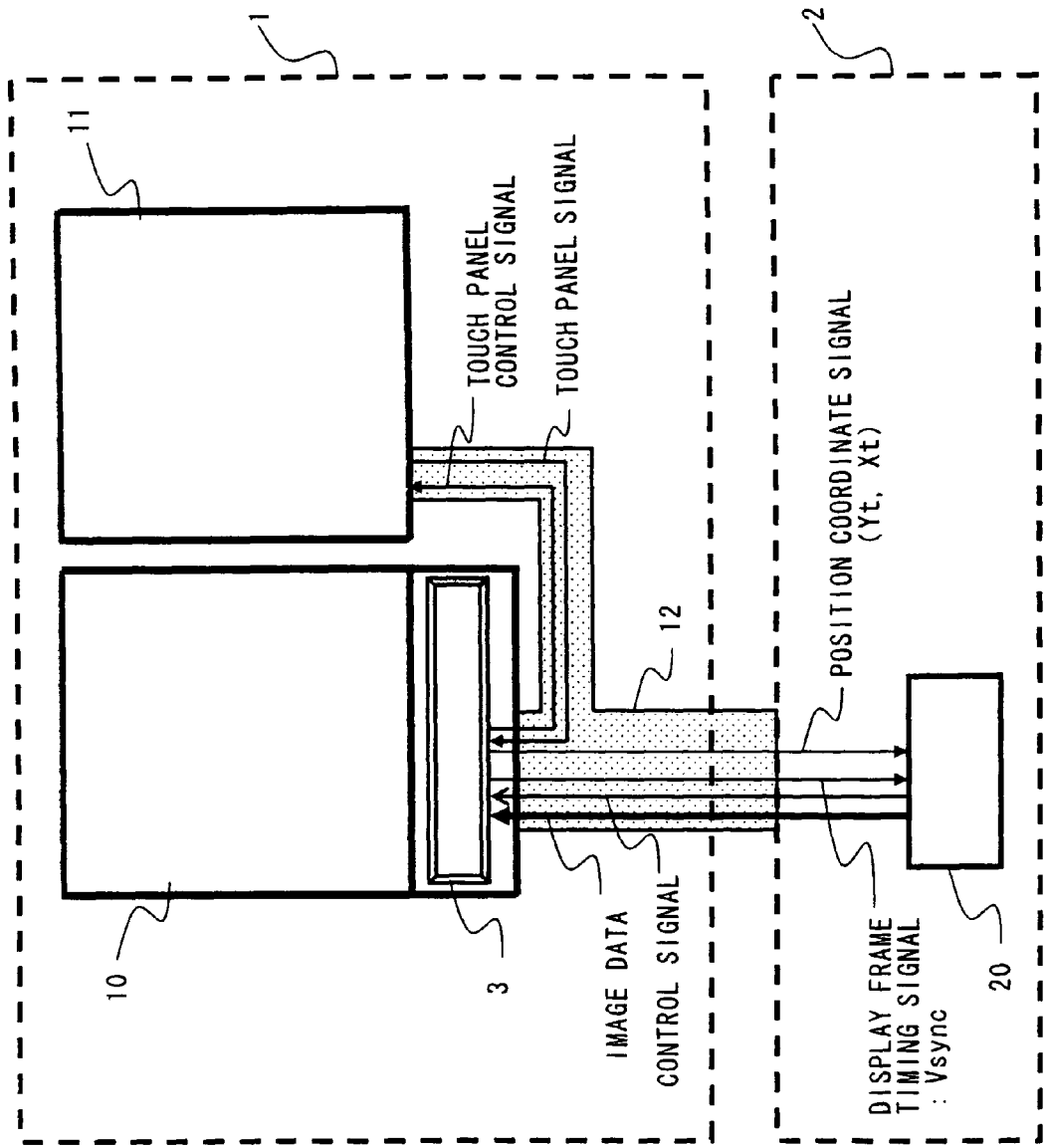
FIG. 1 is a diagram showing a configuration of a display device according to a first exemplary embodiment of the present invention.

A controller driver and a display device according to a first exemplary embodiment of the present invention will be described with reference to FIGS. 1 to 6. A display device used for a cellular phone is herein described as an example of the display device. FIG. 1 is a diagram showing a schematic system configuration of a cellular phone according to this exemplary embodiment. As shown in FIG. 1, the cellular phone according to this exemplary embodiment includes a display block 1 and a cellular phone main-body block 2. The display block 1 includes a display panel 10 and a touch panel 11, and the cellular phone main-body block 2 includes a CPU 20.

Referring to FIG. 1, the touch panel 11 is disposed beside the display panel 10 for convenience of explanation, but the touch panel 11 is actually disposed on the display panel 10. Note that if the display panel 10 is an LCD, a backlight is separately provided in the display block, and the backlight, the display panel, and the touch panel are stacked in this order.

In this exemplary embodiment, a description is given of an example of using a thin film transistor (TFT) type LCD as the display panel 10.

The display panel 10 includes a display area composed of a plurality of pixels. The display panel 10 has a structure in which a liquid crystal is sandwiched between an element substrate in which TFTs are formed, and an opposing substrate which is opposed to the element substrate. On the element substrate, scanning lines which extend horizontally and signal lines which extend vertically are formed. TFTs serving as active elements are disposed near intersections between the scanning lines and the signal lines. Between the scanning lines and the signal lines, pixel electrodes are formed. The gates of the TFTs are connected to the scanning lines, the source electrodes thereof are connected to the signal lines, and the drain electrodes thereof are connected to the pixel electrodes. Meanwhile, on the opposing substrate, a common electrode is formed.

A pixel capacitor is formed between each pixel electrode and the common electrode. Further, between the electrodes connected to the signal lines of the TFTs and the scanning lines or the common electrode, an auxiliary capacitor is formed. In this exemplary embodiment, V pixels which are disposed in the vertical direction and H pixels which are disposed in the horizontal direction are arranged in a matrix form on the display panel 10. One pixel is composed of three RGB picture elements. Accordingly, V scanning lines and H×3 signal lines are formed on the display panel 10.

For example, a capacitive touch panel can be used as the touch panel 11. The capacitive touch panel includes a pair of electrodes arranged with an interval, and detects a change in capacitance between the pair of electrodes, which occurs when a finger of an operator comes close to the pair of electrodes, thereby recognizing an input by the operator. Note that the touch panel 11 is not limited to this example, and other types of touch panels such as a resistive touch panel can also be employed.

A controller driver 3 according to this exemplary embodiment is provided on the display panel 10. The controller driver 3 drives the display panel 10 and controls the touch panel 11. An FPC 12 connects the touch panel 11 and the display panel 10 to each other, and also connects the display panel 10 and the CPU 20 to each other. The CPU 20 is connected to the controller driver 3, which is provided on the display panel 10, through the FPC 12.

The controller driver 3 outputs a touch panel control signal for controlling the touch panel 11. The touch panel 11 outputs a touch panel signal when an external input is applied. The touch panel signal is input to the controller driver 3. The controller driver 3 calculates a position coordinate signal (Yt, Xt) based on touch panel information, and transfers the position coordinate signal to the CPU 20. In addition, a display frame timing signal Vsync is transferred from the controller driver 3 to the CPU 20.

The CPU 20 outputs image data Din and a control signal to the controller driver 3. The display panel 10 is driven by the controller driver 3 which is controlled in accordance with the image data Din and control signal received from the CPU 20.

Figure 2:
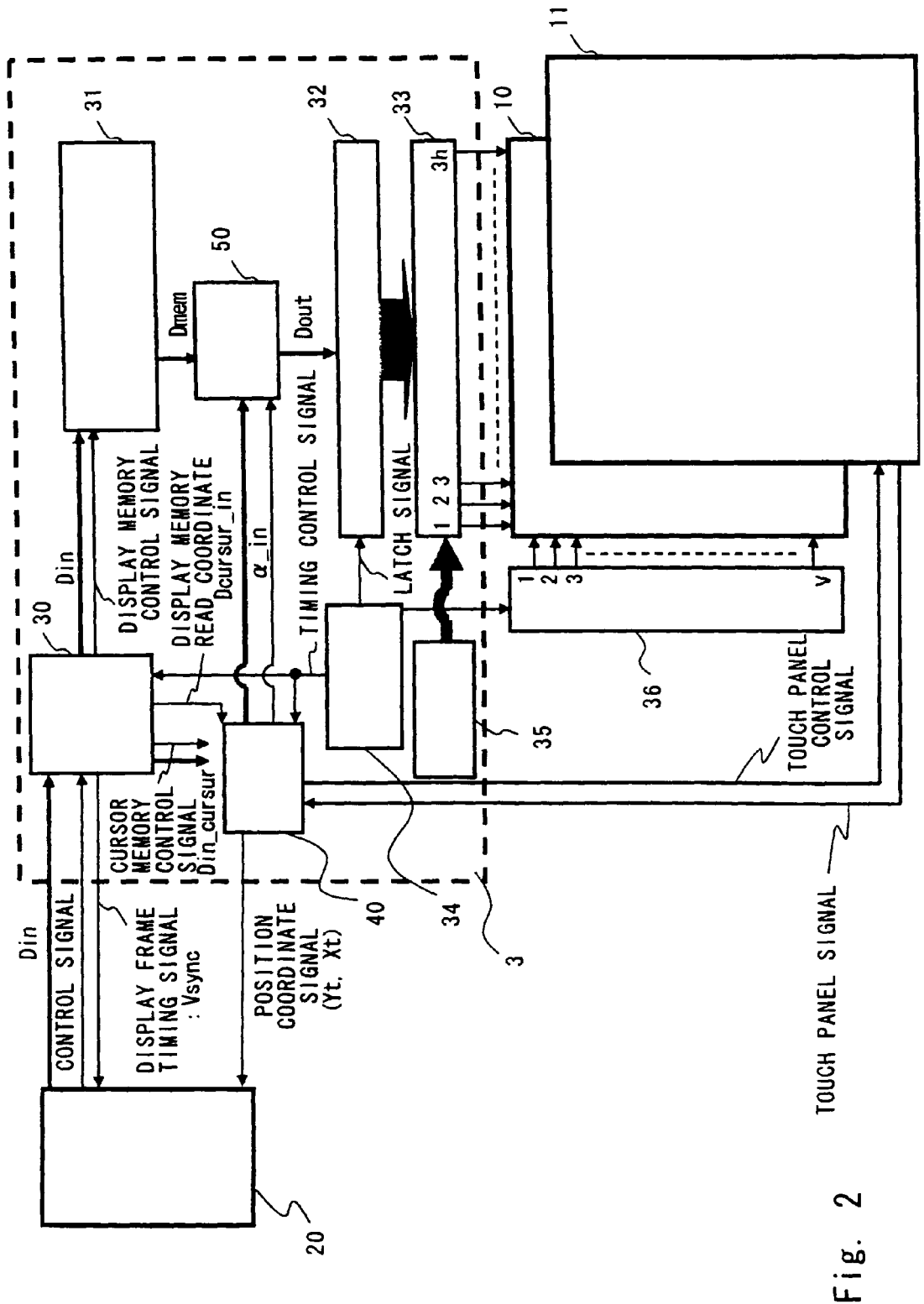
FIG. 2 is a diagram showing a configuration of a controller driver according to the first exemplary embodiment.
Figure 18:
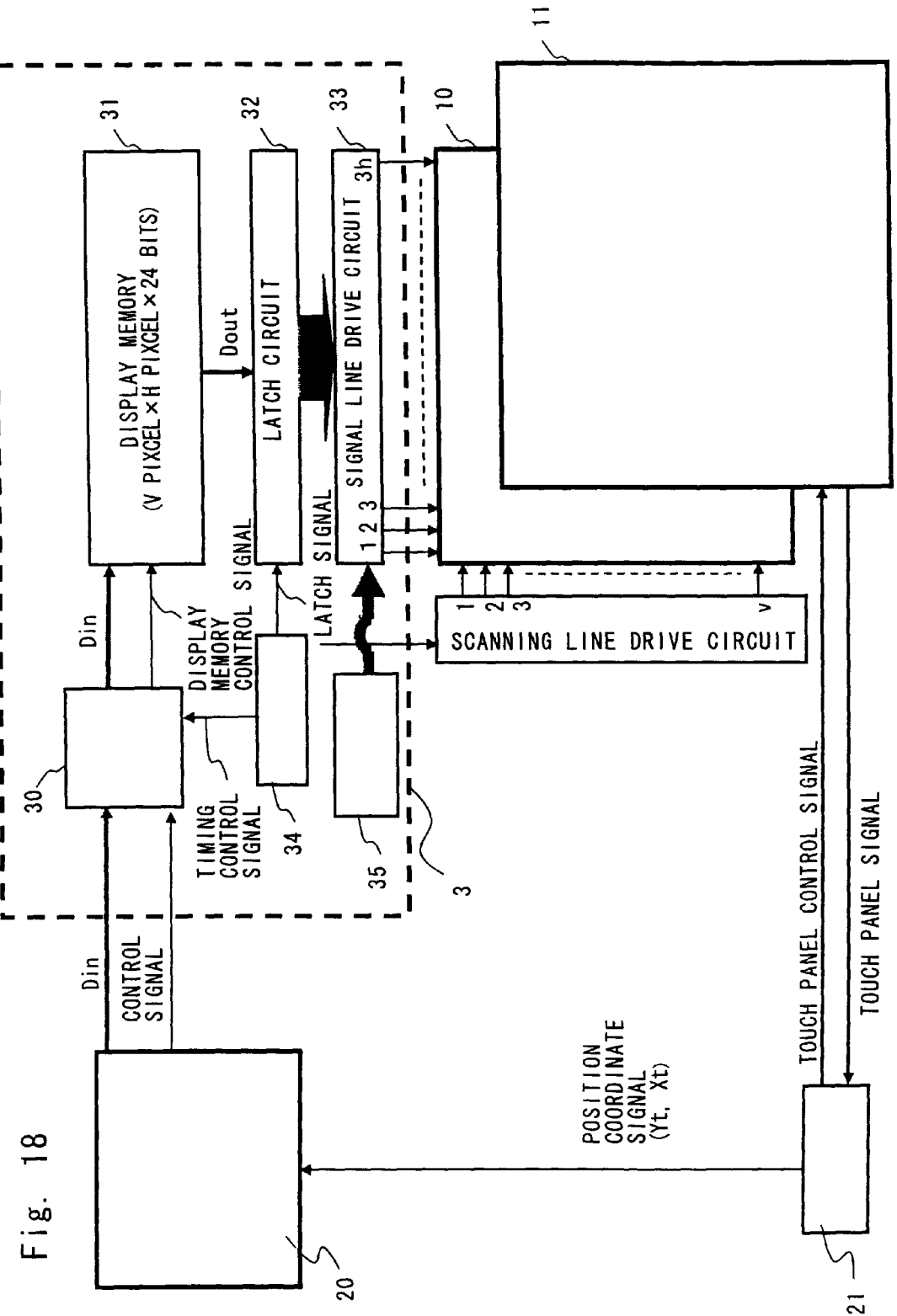
FIG. 18 is a diagram showing a configuration of a controller driver according to the related art.
Figure 19:
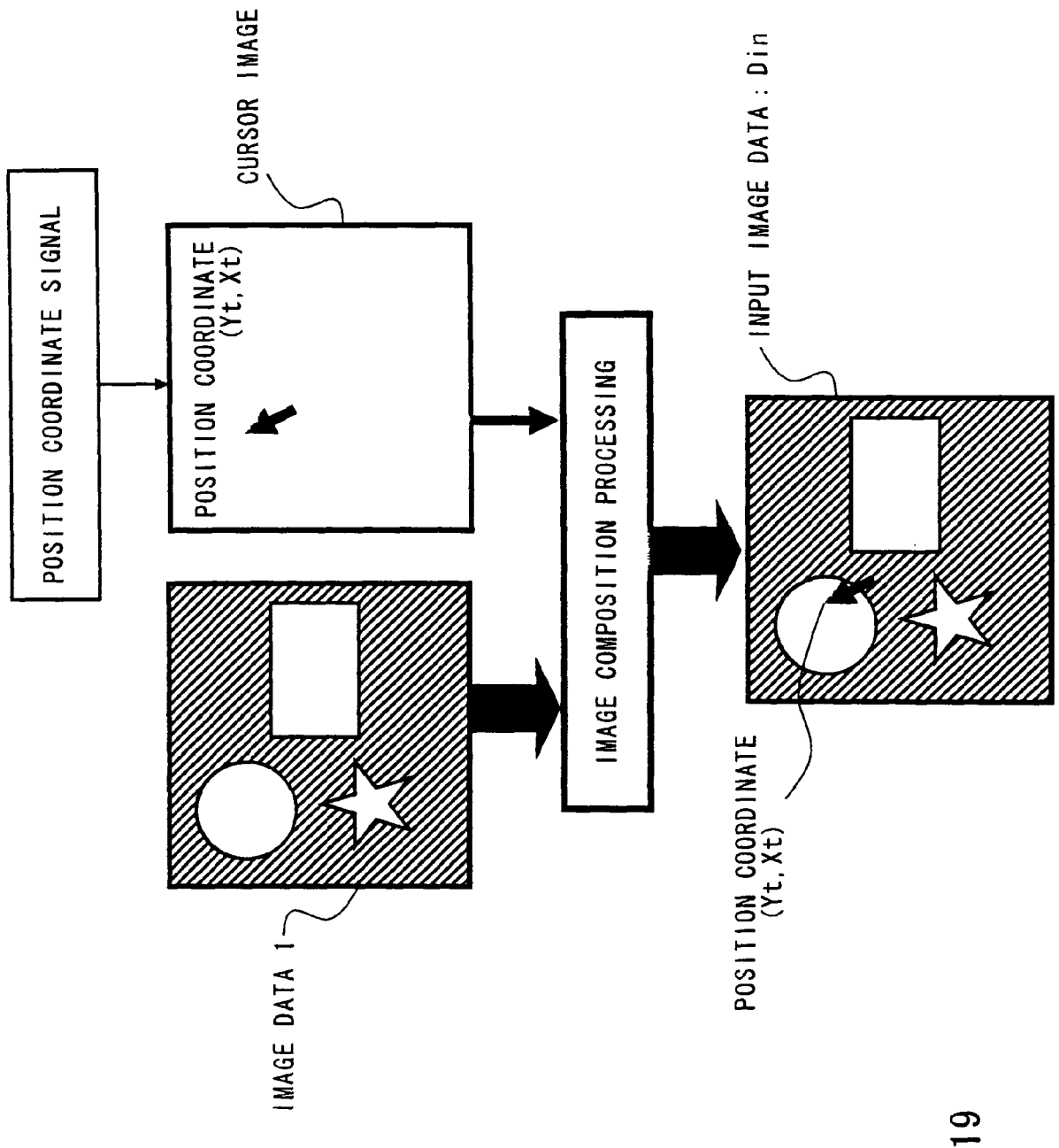
FIG. 19 is a diagram illustrating a processing flow of the controller driver according to the related art.

FIG. 2 is a diagram showing the configuration of the controller driver 3 according to this exemplary embodiment. As shown in FIG. 2, the controller driver 3 includes a display memory 31, a latch circuit 32, a signal line drive circuit 33, a timing control circuit 34, a grayscale voltage generation circuit 35, a scanning line drive circuit 36, a touch panel control circuit 40, and a composition processing circuit 50. In comparison with the controller driver of the related art shown in FIG. 18, the controller driver 3 of this exemplary embodiment is additionally provided with the touch panel control circuit 40 and the composition processing circuit 50. In this exemplary embodiment, the controller driver 3 is configured as one chip.

In the case of overwriting display memory storage image data Dmem to be displayed on the display panel 10, a memory control circuit 30 sends the image data Din from the CPU 20 and a display memory control signal to the display memory 31. The display memory 31 stores V pixels×H pixels×24 bits of the display memory storage image data Dmem, for example. In the case of overwriting cursor image data Dcursur or the like stored in the touch panel control circuit 40, the memory control circuit 30 sends Din_cursur and a cursor memory control signal to the touch panel control circuit 40. The Din_cursur is sent by the CPU 20 and allows the cursor1 image data Dcursur to be changed.

If the display memory storage image data Dmem and the cursor image data Dcursur, for example, are not overwritten, the CPU 20 stops operating. That is, if a touch position on the touch panel 11 is changed without changing these pieces of image data, a background image and a cursor image are not combined by the CPU 20. Instead, a circuit incorporated in the controller driver 3, which is described later, generates composite image data. The memory control circuit 30 outputs display memory read coordinates for use in combining the cursor image data and the display memory storage image data, to the touch panel control circuit 40.

The touch panel control circuit 40 outputs the touch panel control signal for controlling the touch panel 11. The touch panel control circuit 40 calculates the position coordinate signal (Yt, Xt) based on the touch panel signal received from the touch panel 11, and transfers the position coordinate signal to the CPU 20. In addition, the touch panel control circuit 40 outputs cursor image data Dcursur_in and an image composition control signal α_in which are controlled by the position coordinate signal (Yt, Xt).

The composition processing circuit 50 is a circuit that combines the image data Dmem, which is read out from the display memory 31, with the cursor image data Dcursur_in, to thereby generate composite image data Dout. In this exemplary embodiment, an blend circuit is used as the composition processing circuit 50. In this case, the image data Dmem read out from the display memory 31 and the cursor image data Dcursur_in are subjected to combining processing based on the following Expression (1) at the ratio of the image composition control signal α_in.

$$D\text{out}=(D\text{cursur\_in}\times\alpha\_\text{in}+D\text{mem}\times(\alpha\text{step\_max}-\alpha\_\text{in}))/\alpha\text{step\_max} \quad (1)$$

where αstep_max represents the number of steps for combining the image data and the cursor image data, and is a maximum value of the image composition control signal α_in.

The timing control circuit 34 outputs serial image data and various control signals (such as a gate control signal, a timing control signal, and a latch signal) necessary for display. In other words, the timing control circuit 34 acts to control timings of the memory control circuit 30, the latch circuit 32, and the scanning line drive circuit 36. The latch circuit 32 holds the composite image data which is received from the composition processing circuit 50 in response to the latch signal from the timing control circuit 34 and which is obtained by combining the image data and the cursor image data.

The grayscale voltage generation circuit 35 generates a grayscale voltage corresponding to each grayscale, and outputs the generated grayscale voltage to the signal line drive circuit 33. The signal line drive circuit 33 converts digital image data sent from the latch circuit 32 into an analog grayscale voltage. Specifically, the signal line drive circuit 33 selects a grayscale voltage corresponding to the received image data from among voltages supplied from the grayscale voltage generation circuit 35. The selected grayscale voltage is written into pixels of the display panel 10 through the signal lines.

The scanning line drive circuit 36 designates a pixel to be written. Specifically, the scanning lines are each supplied with a pulse-like scanning signal from the scanning line drive circuit 36. When the scanning signal supplied to a certain scanning line is at ON level, TFTs connected to the certain scanning line are all turned on. The grayscale voltage supplied to the signal line from the signal line drive circuit 33 is further supplied to pixel electrodes through the ON-state TFTs. After that, when the scanning signal becomes OFF level and the TFTs are turned off, the supplied grayscale voltage is held by a liquid crystal capacitor, an auxiliary capacitor, or the like until a scanning signal for a subsequent frame is supplied. Then, scanning signals are sequentially supplied to the scanning lines to supply a predetermined grayscale voltage to all the pixel electrodes, and the grayscale voltage is rewritten every frame period, thereby making it possible to display an image.

The alignment of liquid crystal between the pixel electrodes and the common electrode varies depending on a voltage difference between each pixel electrode and the common electrode. This allows control of the transmittance of light incident from a backlight (not shown). The pixels of the display panel 10 cause display of various colors by color tones depending on transmitted light intensity and RGB color representation.

Figure 3:
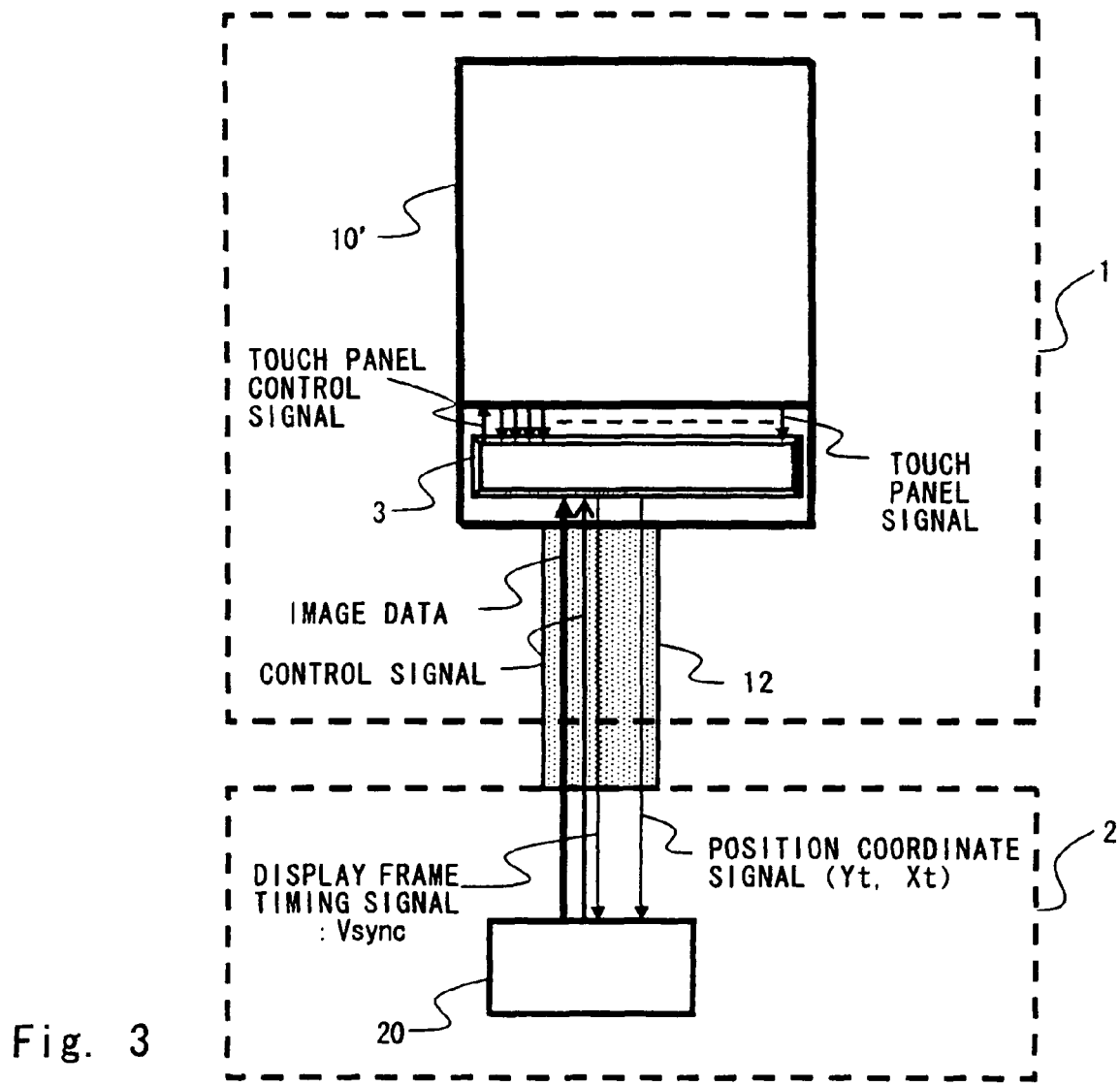
FIG. 3 is a diagram showing another configuration of the display device according to the first exemplary embodiment.

Thus, according to an exemplary embodiment of the present invention, the controller driver 3 can output the image data obtained by combining the image data stored in the display memory 31 with the cursor image. This eliminates the need for the CPU 20 to generate composite image data and alleviates the processing load. Further, there is no need to send the composite image data to the controller driver 3. This results in a reduction in power consumption. In recent years, as shown in FIG. 3, a display panel 10' having a touch panel function has been developed. It is extremely significant that the controller driver 3 includes the touch panel control circuit 40 and has a function for generating a combined image as in the present invention.

Figure 4:
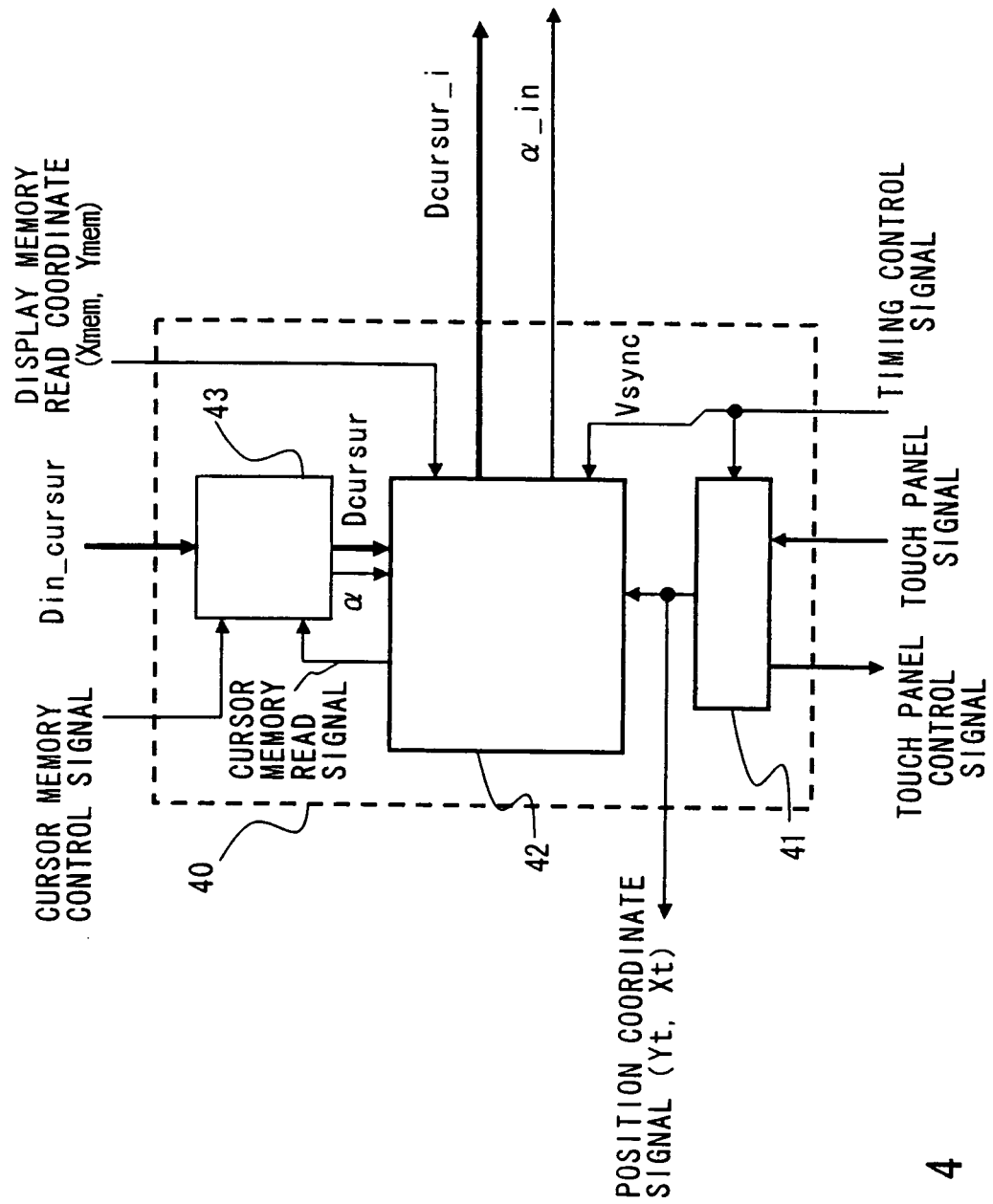
FIG. 4 is a diagram showing a configuration of a touch panel control circuit used for the controller driver according to the first exemplary embodiment.

Referring now to FIG. 4, the touch panel control circuit 40 will be described in detail. FIG. 4 is a diagram showing the configuration of the touch panel control circuit 40 used for the controller driver 3 according to this exemplary embodiment. As shown in FIG. 4, the touch panel control circuit 40 includes a touch panel control circuit 41, a cursor data output determination circuit 42, and a cursor memory 43. The touch panel control circuit 41 outputs a touch panel control signal for controlling the touch panel 11. The touch panel control circuit 41 generates the position coordinate signal (Yt, Xt) upon receiving the touch panel signal.

The cursor memory 43 stores the cursor image data Dcursur and image combining ratio data α. FIG. 5 shows examples of the cursor image data Dcursur and the image combining ratio data α which are stored in the cursor memory 43. The cursor image can be changed by changing the data stored in the cursor memory 43. Upon receiving the position coordinate signal (Yt, Xt), the cursor data output determination circuit 42 compares the position coordinate signal (Yt, Xt) with a display memory read coordinate (Ymem, Xmem), and reads out the cursor image data Dcursur and the image combining ratio data a from the cursor memory in response to a cursor memory read signal. The cursor data output determination circuit 42 then outputs the cursor image data Dcursur_in and image composition control signal α_in. The display memory read coordinate (Ymem, Xmem) correspond to each pixel of the display panel 10.

Figure 6:
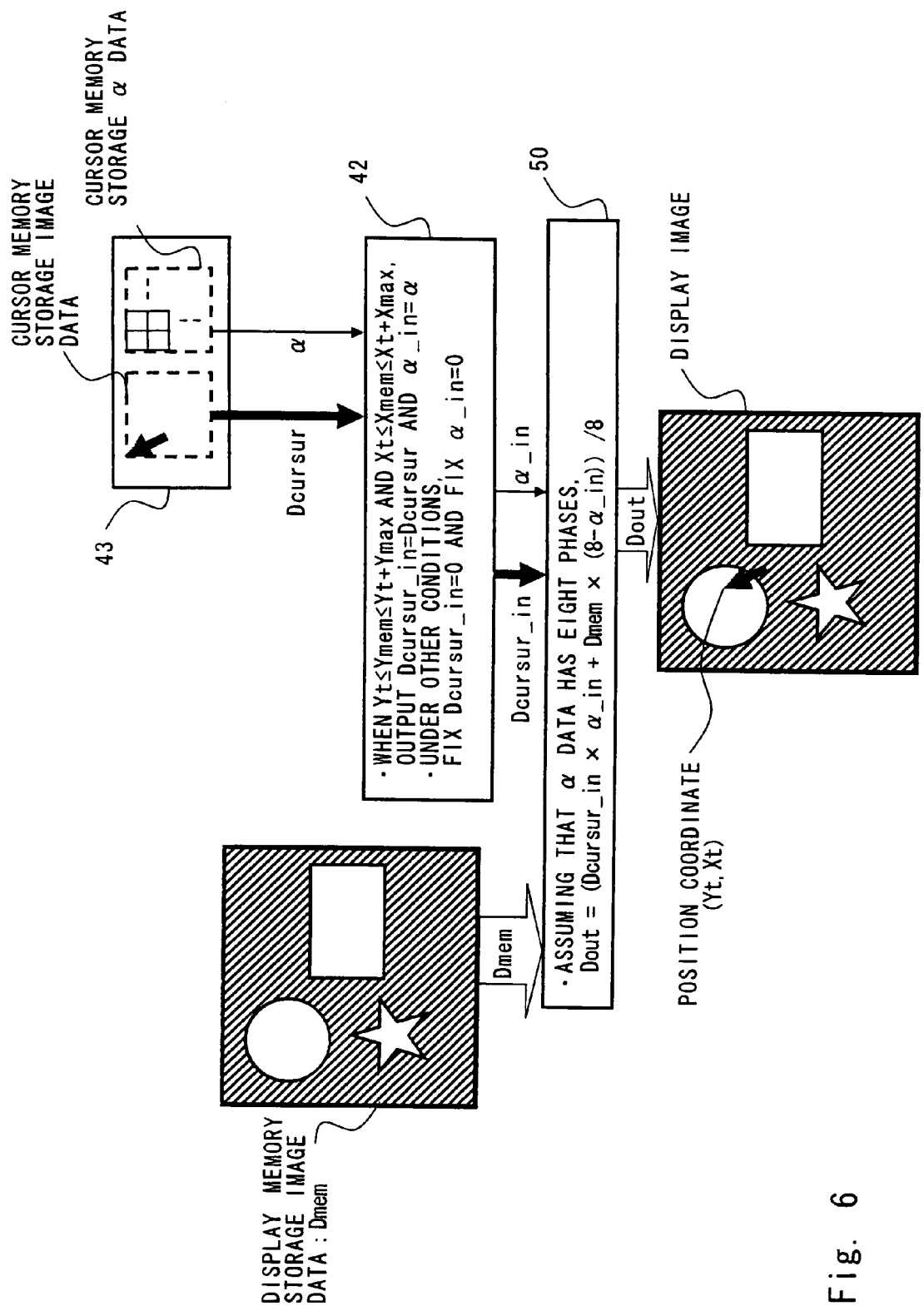
FIG. 6 is a diagram illustrating an example of a processing flow of the controller driver according to the first exemplary embodiment.

FIG. 6 is a diagram illustrating a specific processing flow of the controller driver 3 according to this exemplary embodiment. A description is herein given of the case where an arrow is used as an example of the cursor image and the tip end of the arrow indicates the upper-left corner of cursor memory storage image data. In this example, the tip end of the arrow representing the cursor image is set as an origin (0, 0). Additionally, the maximum address of the cursor memory storage image data is represented by (Ymax, Xmax).

As shown in FIG. 6, when the display memory read coordinate (Ymem, Xmem) is equal to or greater than the position coordinate signal (Yt, Xt) and is equal to or smaller than a coordinate obtained by adding the maximum address (Ymax, Xmax) of the cursor memory 43 to the position coordinate signal (Yt, Xt), the cursor data output determination circuit 42, upon receiving the position coordinate signal (Yt, Xt), reads out the cursor image data Dcursur and the image combining ratio data α from the cursor memory 43 and outputs Dcursur_in=Dcursur and α_in=α. That is, when Yt<=Ymem<=Yt+Ymax and Xt<=Xmem<=Xt+Xmax are satisfied, the cursor data output determination circuit 42 outputs the composite image data obtained by combining the cursor image data with the image data serving as a background image at the ratio of α_in=α.

Under the other conditions, Dcursur_in=0 and α_in=0 are fixed. Specifically, when Ymem<Yt or Yt+Ymax<Ymem and Xmem<Xt or Xt+Xmax<Xmem are satisfied, Dcursur_in=0 and α_in=0 are obtained. Accordingly, the display memory storage image data Dmem serving as a background image is directly output as the composite image data Dout.

As shown in Expression (1), the composition processing circuit 50 combines the display memory storage image data Dmem and the cursor image data Dcursur_in at the ratio of α_in. FIG. 6 shows an example assuming that αstep_max=8. Accordingly, in this exemplary embodiment, the composition processing circuit 50 executes arithmetic processing of Dout=(Dcursur_in×α_in+Dmem×(8−α_in))/8. As a result of the processing flow as described above, the composite image data Dout is generated and a display image as shown in FIG. 6 is displayed.

As described above, according to an exemplary embodiment of the present invention, the processing load of the CPU 20 is alleviated, and the power consumption can be reduced. The cursor image is not limited to an arrow. Alternatively, images of a cross, an animal, and the like may be used. The origin of the cursor image may be set at any position in the cursor image. In this case, the comparison expressions used in the cursor data output determination circuit 42 for the display memory read coordinate (Ymem, Xmem) and the range of coordinates in which the cursor image cursor image is displayed may be changed as appropriate.

[Second Exemplary Embodiment]

Figure 7:
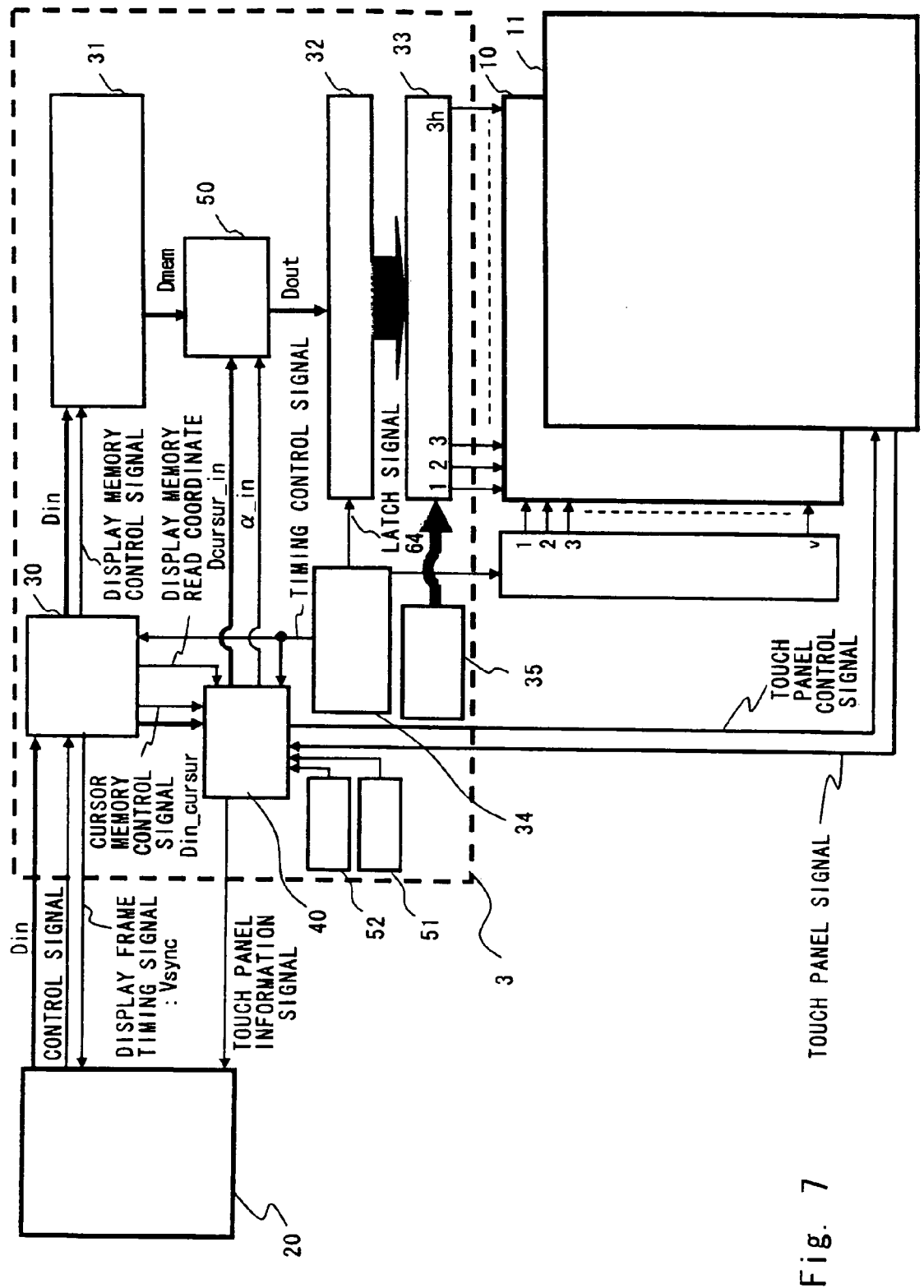
FIG. 7 is a diagram showing a configuration of a controller driver according to a second exemplary embodiment of the present invention.

The configuration of the controller driver 3 according to a second exemplary embodiment of the present invention will be described with reference to FIGS. 7 to 12. The controller driver 3 according to this exemplary embodiment is used as the drive circuit of the display panel 10 including the touch panel 11, like in the first exemplary embodiment. FIG. 7 is a diagram showing the configuration of the controller driver 3 according to this exemplary embodiment. In FIGS. 7 to 12, components identical with those of FIGS. 1 to 6 are denoted by the same reference numerals, and the description thereof is omitted as appropriate.

As shown in FIG. 7, the controller driver 3 according to this exemplary embodiment includes the display memory 31, the latch circuit 32, the signal line drive circuit 33, the timing control circuit 34, the grayscale voltage generation circuit 35, the scanning line drive circuit 36, the touch panel control circuit 40, the composition processing circuit 50, a click time register 51, and a click operation register 52. In comparison with the controller driver according to the first exemplary embodiment shown in FIG. 2, the controller driver of this exemplary embodiment is additionally provided with the click time register 51 and the click operation register 52.

The click time register 51 stores time data and click time Tclick for determining the click operation. For example, when the input of the position coordinate signal from the touch panel 11 is equal to or smaller than the click time Tclick, it can be determined that the click operation has been carried out. Meanwhile, when the touch panel 11 is continuously pressed for a time period longer than the click time Tclick, it can be determined that not the click operation but a normal input operation has been carried out.

The click operation register 52 stores various data for displaying the cursor image in a predetermined manner to indicate that the click operation has been carried out in the case where the click operation has been actually carried out. For example, as described later, the click image is enlarged or the transmissivity of the click image is changed for a certain period after the click operation is carried out. The image data which is displayed in the predetermined manner to indicate that the click operation has been carried out is generated in a circuit incorporated in the controller driver 3 which is described later.

In this exemplary embodiment, the touch panel control circuit 40 sends a touch panel information signal to the CPU 20. The touch panel information signal contains the position coordinate signal (Yt, Xt) as well as a click signal, for example. The CPU 20 can overwrite the contents of the display memory storage image data Dmem and the like according to the touch panel information. Note that it is desirable to overwrite the display memory storage image data Dmem after the display operation to indicate that the click operation has been carried out is finished. The CPU 20 can determine whether the display operation to indicate that the click operation has been carried out is finished, based on the touch panel information signal and the display frame timing signal Vsync which are output from the controller driver 3.

Figure 8:
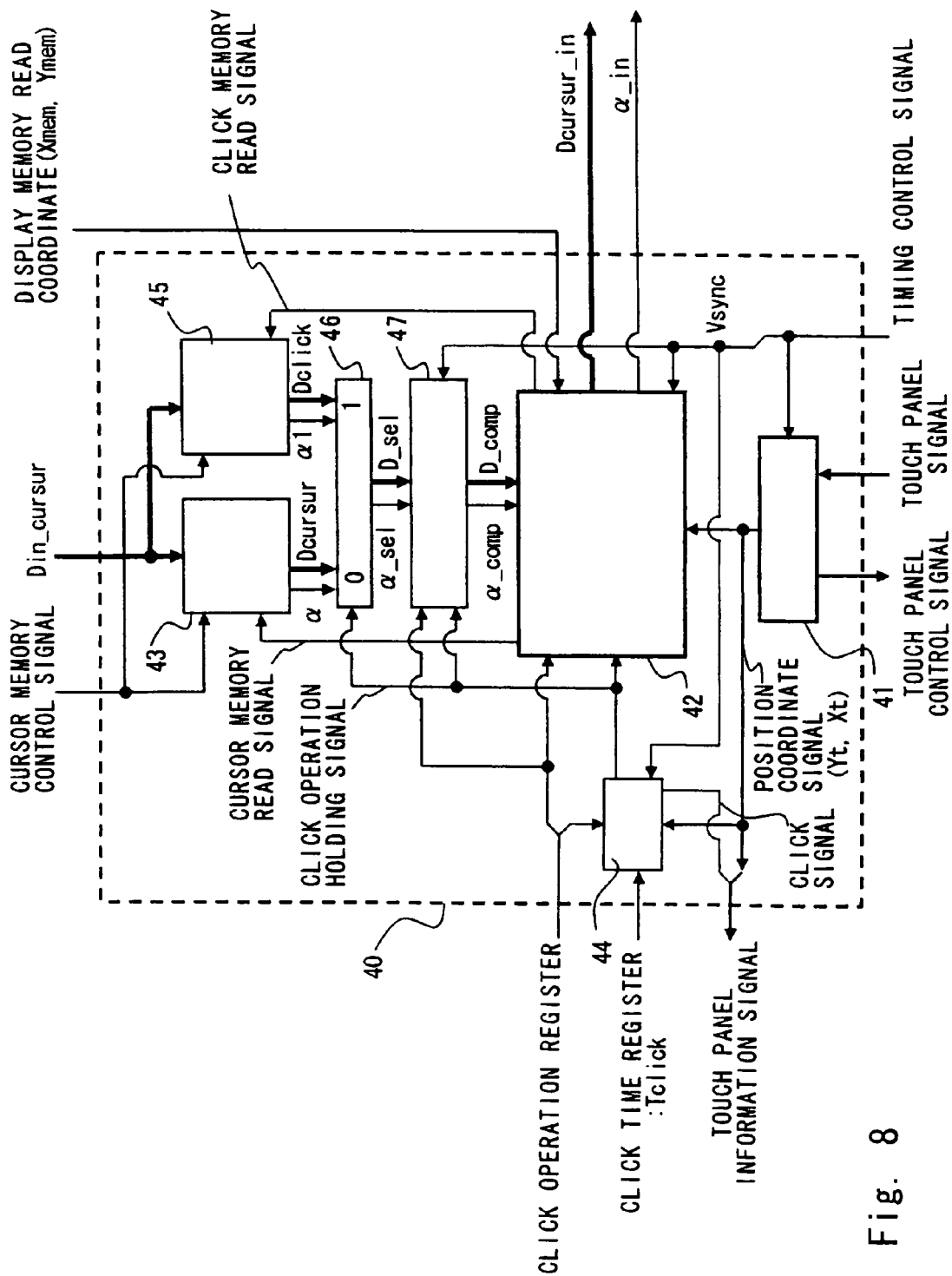
FIG. 8 is a diagram showing a configuration of a touch panel control circuit used for the controller driver according to the second exemplary embodiment.

Referring now to FIG. 8, the configuration of the touch panel control circuit 40 according to this exemplary embodiment will be described. FIG. 8 is a diagram showing the configuration of the touch panel control circuit 40. As shown in FIG. 8, the touch panel control circuit 40 includes the touch panel control circuit 41, the cursor data output determination circuit 42, the cursor memory 43, a click determination circuit 44, a click memory 45, a selection circuit 46, and a conversion circuit 47. In comparison with the touch panel control circuit 40 shown in FIG. 4, the touch panel control circuit 40 of this exemplary embodiment is additionally provided with the click determination circuit 44, the click memory 45, the selection circuit 46, and the conversion circuit 47.

The click memory 45 stores click image data Dclick and image combining ratio data α1. FIG. 9 shows examples of the click image data Dclick and the image combining ratio data α1 which are stored in the click memory 45. The click image can be changed by changing the data stored in the click memory 45.

FIG. 10 shows an example of the touch panel information signal which is sent to the CPU 20. As shown in FIG. 10, the touch panel information signal is a combined signal of the click signal indicating whether the click operation has been carried out and the position coordinate signal (Yt, Xt). FIG. 11 shows an example of the data stored in the click operation register 52. As shown in FIG. 11, the click operation register 52 stores, for example, a click operation holding time Tcset, an enlargement ratio S, an α change ratio αplus, and an enlargement change ratio Splus.

The click determination circuit 44 compares the click time Tclick stored in the click time register 51 with the input time of the position coordinate signal (Yt, Xt) output from the touch panel control circuit 41, and outputs the click signal indicating whether the click operation has been carried out. For example, when a time period for continuously inputting the position coordinate signal (Yt, Xt) is equal to or less than the click time Tclick, the click signal becomes high. On the other hand, when the time period for continuously inputting the position coordinate signal (Yt, Xt) is longer than the click time Tclick, the click signal becomes low level. After the click signal becomes high, the click determination circuit 44 outputs a click operation holding signal for holding the high period for a period of time set according to the click operation holding time Tcset stored in the click operation register 52.

The selection circuit 46 is a circuit that selects data (Dcursur, α) from the cursor memory 43 and data (Dclick, α1) from the click memory 45 based on the click operation holding signal.

When the click operation holding signal indicates "0", the selection circuit 46 selects the data (Dcursur, α) from the cursor memory 43 as indicated by Expression (2).

$$D\_sel=Dcursur, \alpha\_sel=\alpha \qquad (2)$$

Meanwhile, when the click operation holding signal indicates "1", the selection circuit 46 selects the data (Dclick, α1) from the click memory 45 as indicated by Expression (3).

$$D\_sel=Dclick, \alpha\_sel=\alpha1 \qquad (3)$$

The conversion circuit 47 is a circuit that converts D_sel and α_sel which are received from the selection circuit 46. In this exemplary embodiment, a circuit that converts a scaling factor and α ratio is used as the conversion circuit 47. This circuit makes it possible to enlarge an image based on the D_sel and convert the α_sel to thereby convert the transmissivity. A conversion processing method for the conversion circuit 47 is changed according to the click operation holding signal.

Figure 12:
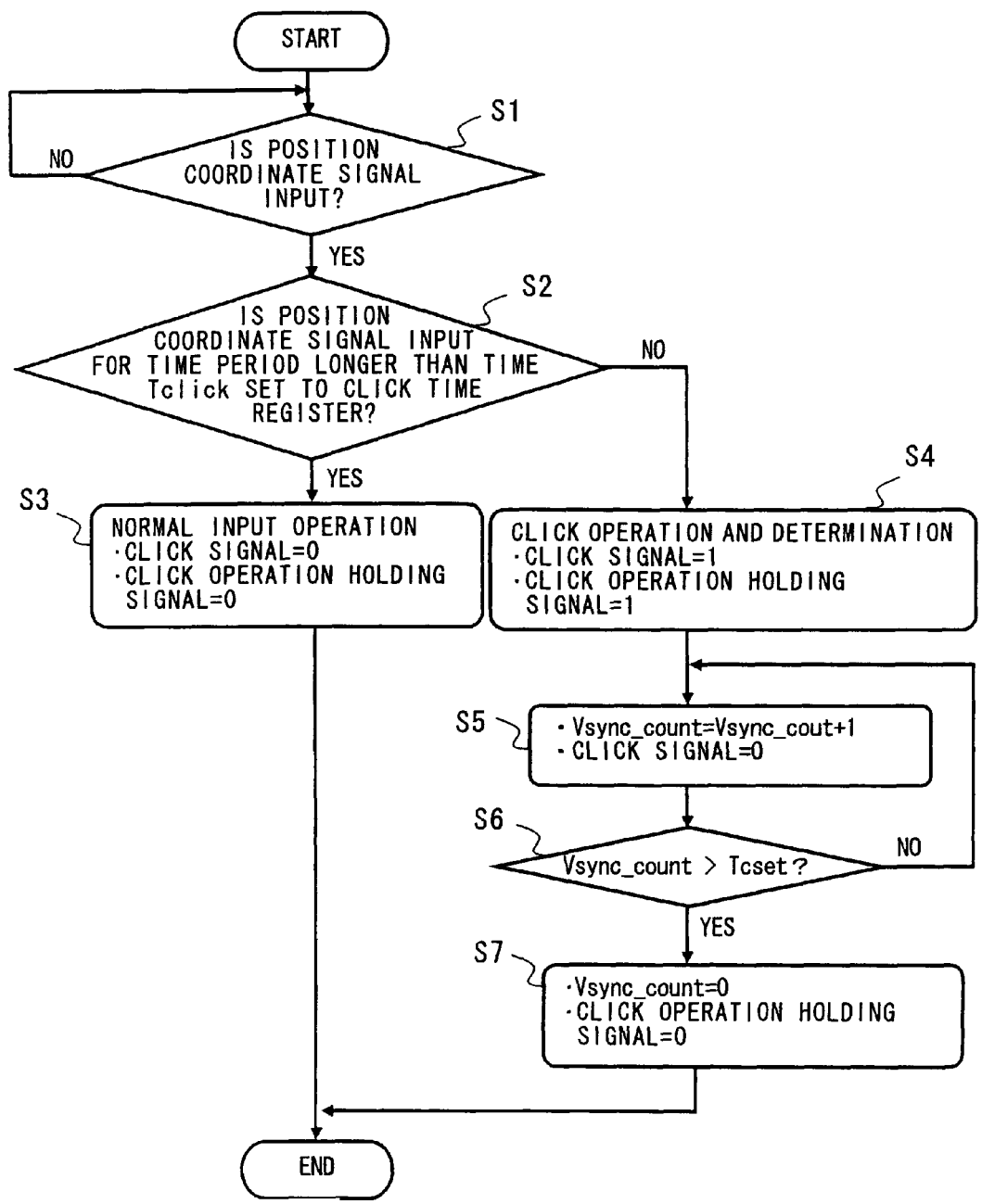
FIG. 12 is a flowchart illustrating a processing flow for generating a click signal and a click operation holding signal according to the second exemplary embodiment.

Referring next to FIG. 12, a processing flow for generating the click signal and click operation holding signal according to this exemplary embodiment will be described. As shown in FIG. 12, it is first determined whether the position coordinate signal (Yt, Xt) is input or not (S1). In the case where the position coordinate signal (Yt, Xt) is input (Yes in S1), it is determined whether the position coordinate signal (Yt, Xt) is input for a time period longer than the click time Tclick which is set to the click time register 51 (S2). When the position coordinate signal is input for a time period longer than the click time Tclick (Yes in S2), it is determined that the normal input operation has been carried out (S3). In this case, the click signal indicates "0" and the click operation holding signal indicates "0".

Figure 13:
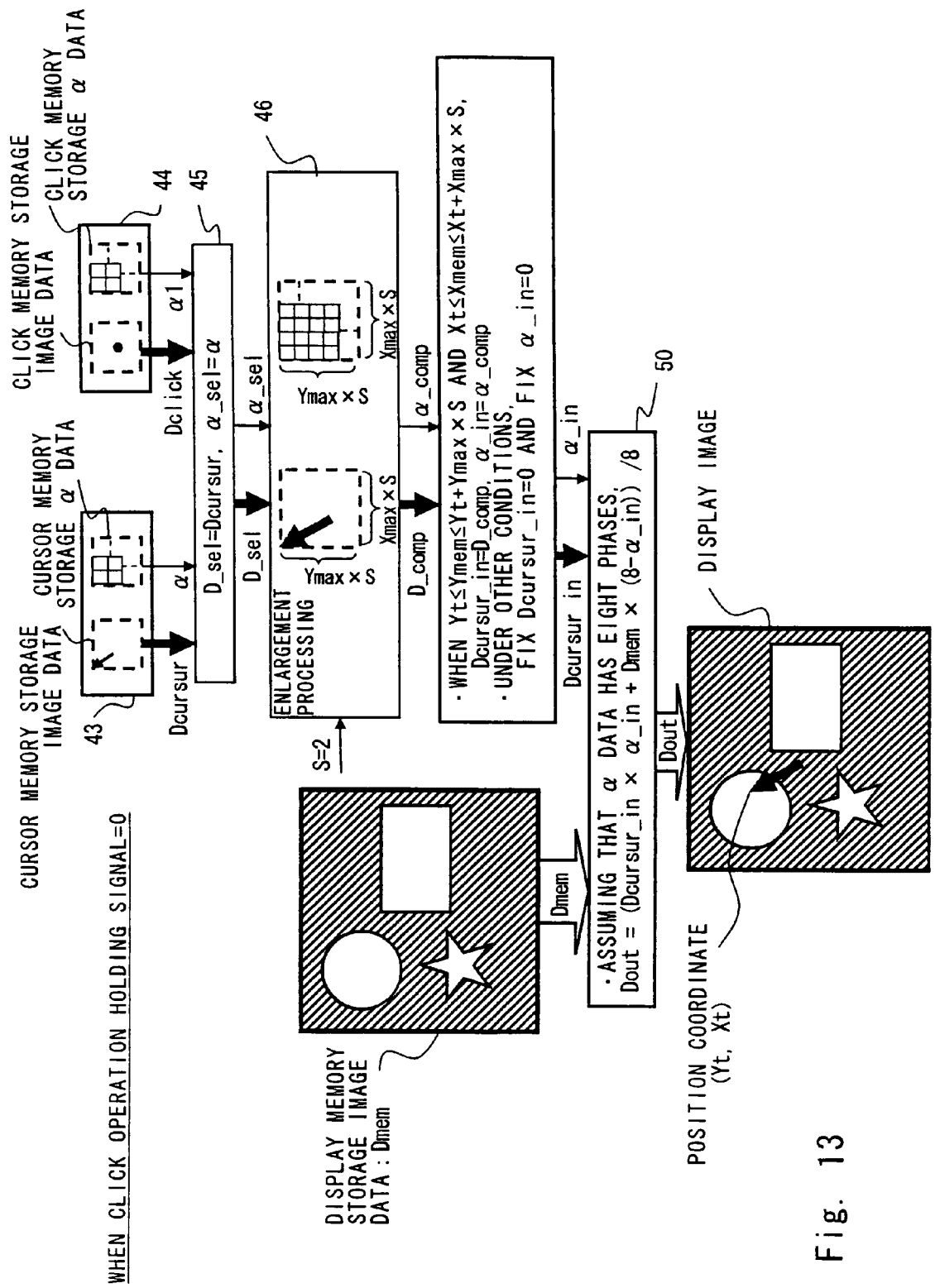
FIG. 13 is a diagram illustrating an example of a processing flow of the controller driver according to the second exemplary embodiment.

FIG. 13 shows a specific processing flow of the controller driver 3 according to this exemplary embodiment when the click operation holding signal indicates "0". As shown in FIG. 13, when it is determined that the position coordinate signal (Yt, Xt) is input and the click operation has not been carried out, the selection circuit 46 selects D_sel=Dcursur and α_sel=α as shown by Expression (2). Basically, the processing for combining the display memory storage image data Dmem and the cursor image data Dcursur as illustrated in FIG. 6 is carried out. The processing shown in FIG. 13 is different from the processing shown in FIG. 6 in that the cursor image data can be enlarged in accordance with the setting of the enlargement ratio S stored in the click operation register 52.

As shown in FIG. 13, when the enlargement ratio S=2, for example, the cursor image data Dcursur and the image composition control signal α which are output from the cursor memory 43 are doubled and output as image data D_comp and image composition control signal α_comp, respectively, after the conversion processing. When the display memory read coordinate (Xmem, Ymem) is equal to or greater than the position coordinate signal (Xt, Yt) and is equal to or smaller than a coordinate obtained by adding the maximum address (Xmax, Ymax)×S of the cursor memory 43 to the position coordinate signal (Xt, Yt), the cursor data output determination circuit 42 reads out the cursor image data Dcursur and the image composition control signal α from the cursor memory, and performs enlargement processing thereon. After that, the cursor data output determination circuit 42 outputs the cursor image data Dcursur and the image composition control signal α as image data D_comp and image composition control signal α_comp, respectively. That is, when Yt<=Ymem<=Yt+Ymax×S and Xt<=Xmem<=Xt+Xmax×S are satisfied, Dcursur_in=D_comp and α_in=α_comp are obtained.

Under the other conditions, Dcursur_in=0 and α_in=0 are fixed. Specifically, when Ymem<Yt or Yt+Ymax×S<Ymem and Xmem<Xt or Xt+Xmax×S<Xmem are satisfied, Dcursur_in=0 and α_in=0 are obtained. Then, the composition processing circuit 50 generates the composite image data Dout, and a display image as shown in FIG. 13 is displayed. By the above-mentioned processing, the setting of the enlargement ratio S is changed, with the result that the size of the cursor image can be freely changed without increasing the size of the cursor memory 43.

Referring again to FIG. 12, when the input of the position coordinate signal (Yt, Xt) is equal to or less than the click time Tclick (No in S2), it is determined that the click operation has been carried out (S4). In this case, the click signal indicates "1" and the click operation holding signal indicates "1".

Figure 14:
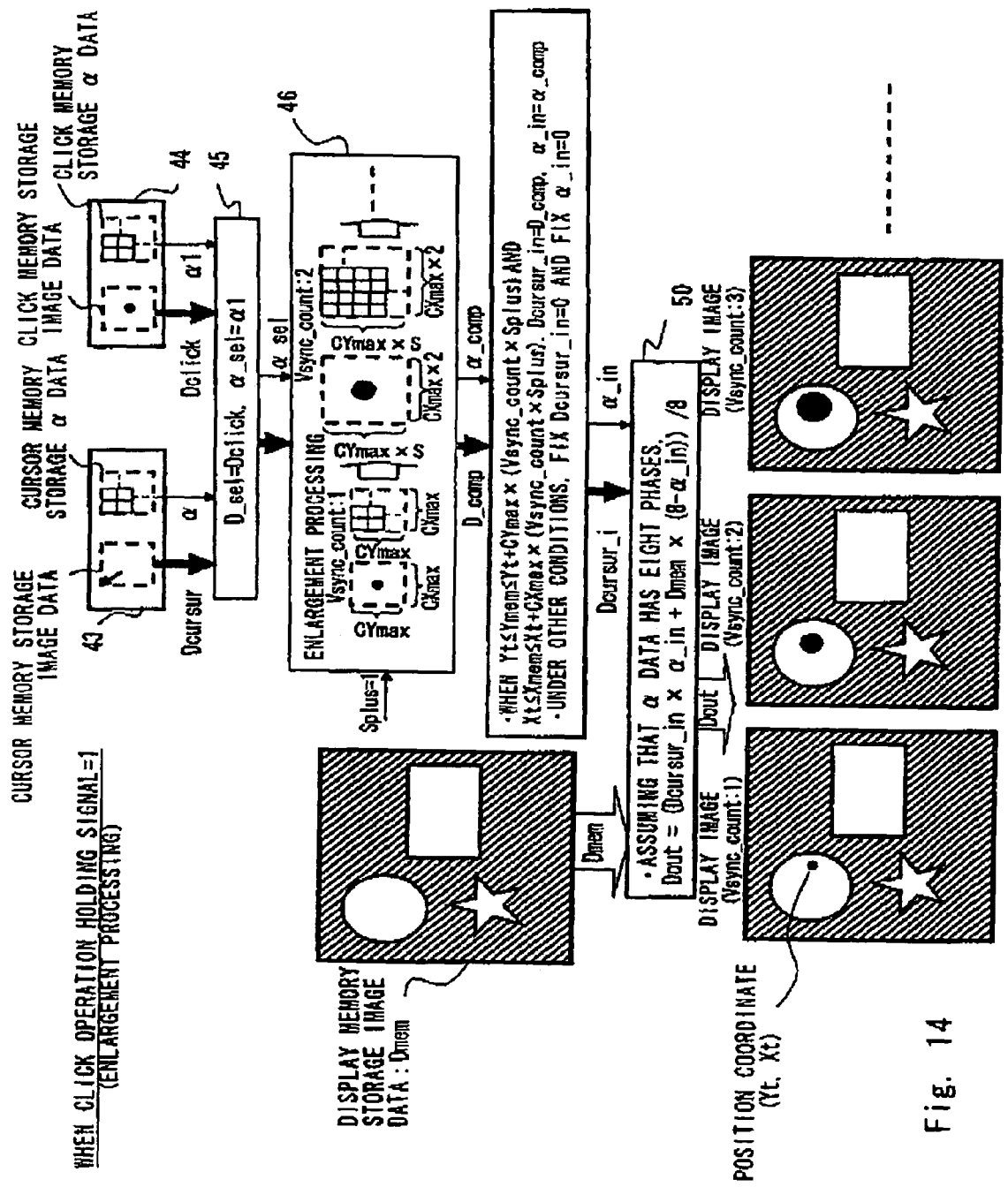
FIG. 14 is a diagram illustrating another example of the processing flow of the controller driver according to the second exemplary embodiment.

FIG. 14 is a flowchart showing a specific processing flow of the controller driver 3 when the click operation holding signal indicates "1". FIG. 14 shows an example where the click image data is subjected to enlargement processing. As shown in FIG. 14, when it is determined that the position coordinate signal (Yt, Xt) is input and the click operation has been carried out, a frame count signal Vsync_count is counted up for each display frame timing signal Vsync as shown in Step S5 of FIG. 12. In Step S5, the click signal indicates "0".

Then, it is determined whether Vsync_count>Tcset is satisfied (S6). When Vsync_count<=Tcset is obtained (No in S6), the process returns to Step S5, and the frame count signal Vsync_count is counted up. During this time, the click operation holding signal indicates "1". On the other hand, when Vsync_count>Tcset is satisfied (Yes in S6), Vsync_count=0 is obtained and the click operation holding signal indicates "0". Accordingly, during a period in which Vsync_count>Tcset is satisfied, the click operation holding signal indicates "0".

As shown in FIG. 14, during a period in which the click operation holding signal indicates "1", the selection circuit 46 selects the click image data Dclick and the image composition control signal α1, which are read out from the click memory 45, as shown in Expression (3). Then, the click image data Dclick and image composition control signal α1 are subjected to enlargement processing of Vsync_count× Splus in the conversion circuit 47 for each display frame timing signal Vsync, and are output as the image data D_comp and image composition control signal α_comp, respectively, after the conversion processing.

As shown in FIG. 14, when enlargement change ratio Splus=1, the click image data Dclick and the image composition control signal α1, which are output from the click memory 45, are enlarged for each display frame timing signal Vsync, and output as the image data D_comp and the image composition control signal α_comp, respectively, after the conversion processing. Specifically, the image data is enlarged to the same size when the frame count signal Vsync_count indicates "1", and the image data is doubled when the frame count signal Vsync_count indicates "2". Thus, the enlargement ratio is increased up to the click operation holding time Tcset.

When the display memory read coordinate (Xmem, Ymem) is equal to or greater than the position coordinate signal (Yt, Xt) and is equal to or smaller than a coordinate obtained by adding a maximum address (CYmax, CXmax)× Vsync_count×Splus of the click memory to the position coordinate signal (Yt, Xt), the cursor data output determination circuit 42 reads out the click image data Dclick and the image composition control signal α1 from the click memory 45, and outputs image data Dcomp and αcomp after the enlargement processing. That is, when Yt<=Ymem<=Yt+CYmax× (Vsync_count×Splus) and Xt<=Xmem<=Xt+CXmax× (Vsync_count×Splus) are satisfied, Dcursur_in=Dcomp and α_in=αcomp are obtained.

Under the other conditions, Dcursur_in=0 and α_in=0 are fixed. Specifically, when Ymem<Yt or Yt+CYmax×(Vsync_ count×Splus)<Ymem and Xmem<Xt or Xt+CXmax× (Vsync_count×Splus)<Xmem are satisfied, Dcursur_in=0 and α_in=0 are obtained. Then, the composition processing circuit 50 generates the composite image data Dout to thereby obtain a display image whose size gradually increases frame by frame as shown in FIG. 14. By the above-mentioned processing, the operator of the touch panel 11 can recognize that the click operation has been carried out.

Figure 15:
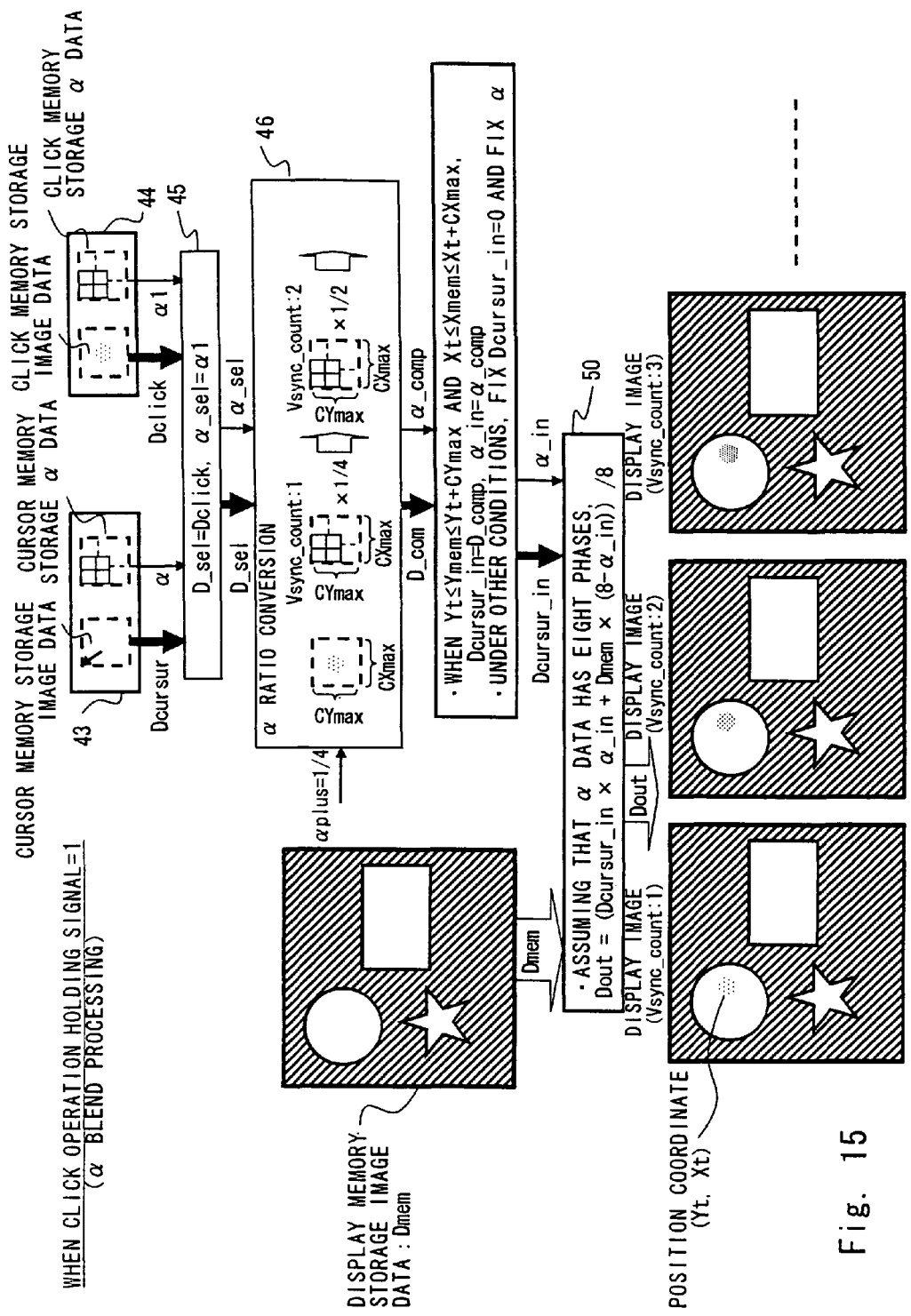
FIG. 15 is a diagram illustrating still another example of the processing flow of the controller driver according to the second exemplary embodiment.

FIG. 15 is a diagram showing another processing flow of the controller driver 3 when the click operation holding signal indicates "1". FIG. 15 shows an example where the ratio α for use in processing for combining the click image data and the display memory storage image data is changed for each display frame timing signal Vsync.

As shown in FIG. 15, during a period in which the click operation holding signal indicates "1", the selection circuit 46 selects the click image data Dclick and the image composition control signal α1 which are read out from the click memory 45. Then, the conversion circuit 47 performs the processing as shown in the following Expression (4) for each display frame timing signal Vsync.

$$D\_comp=D\_sel, \alpha\_comp=\alpha\_sel \times \alpha plus \times Vsync\_count \quad (4)$$

When the display memory read coordinate (Xmem, Ymem) is equal to or greater than the position coordinate signal (Yt, Xt) and is equal to or smaller than a coordinate obtained by adding the maximum address (CYmax, CXmax) of the click memory to the position coordinate signal (Yt, Xt), the cursor data output determination circuit 42 reads out the click image data Dclick and the image composition control signal α1 from the click memory 45, and outputs the image data Dcomp and αcomp after the a ratio conversion processing. That is, when Yt<=Ymem<=Yt+CYmax and Xt<=Xmem<=Xt+CXmax are satisfied, Dcursur_in=D_comp and α_in=α_comp are obtained.

Under the other conditions, Dcursur_in=0 and α_in=0 are fixed. Specifically, when Ymem<Yt or Yt+CYmax<Ymem and Xmem<Xt or Xt+CXmax<Xmem are satisfied, Dcursur_in=0 and α_in=0 are obtained. Then, the composition processing circuit 50 generates the composite image data Dout to thereby obtain a display image in which the click image gradually emerges frame by frame as shown in FIG. 15. By the above-mentioned processing, the operator of the touch panel 11 can recognize that the click operation has been carried out.

Figure 16:
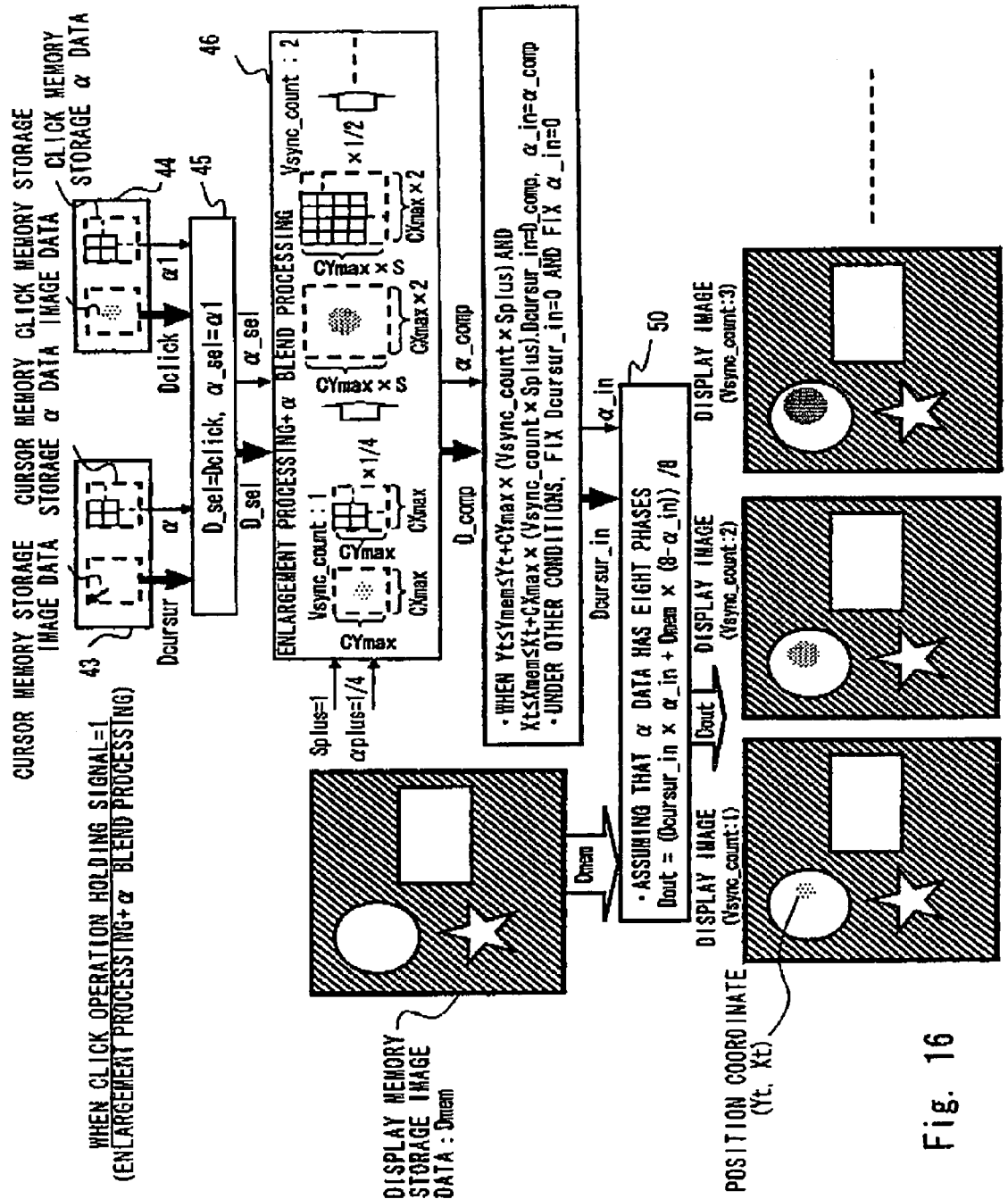
FIG. 16 is a diagram illustrating further another example of the processing flow of the controller driver according to the second exemplary embodiment.
Figure 17:
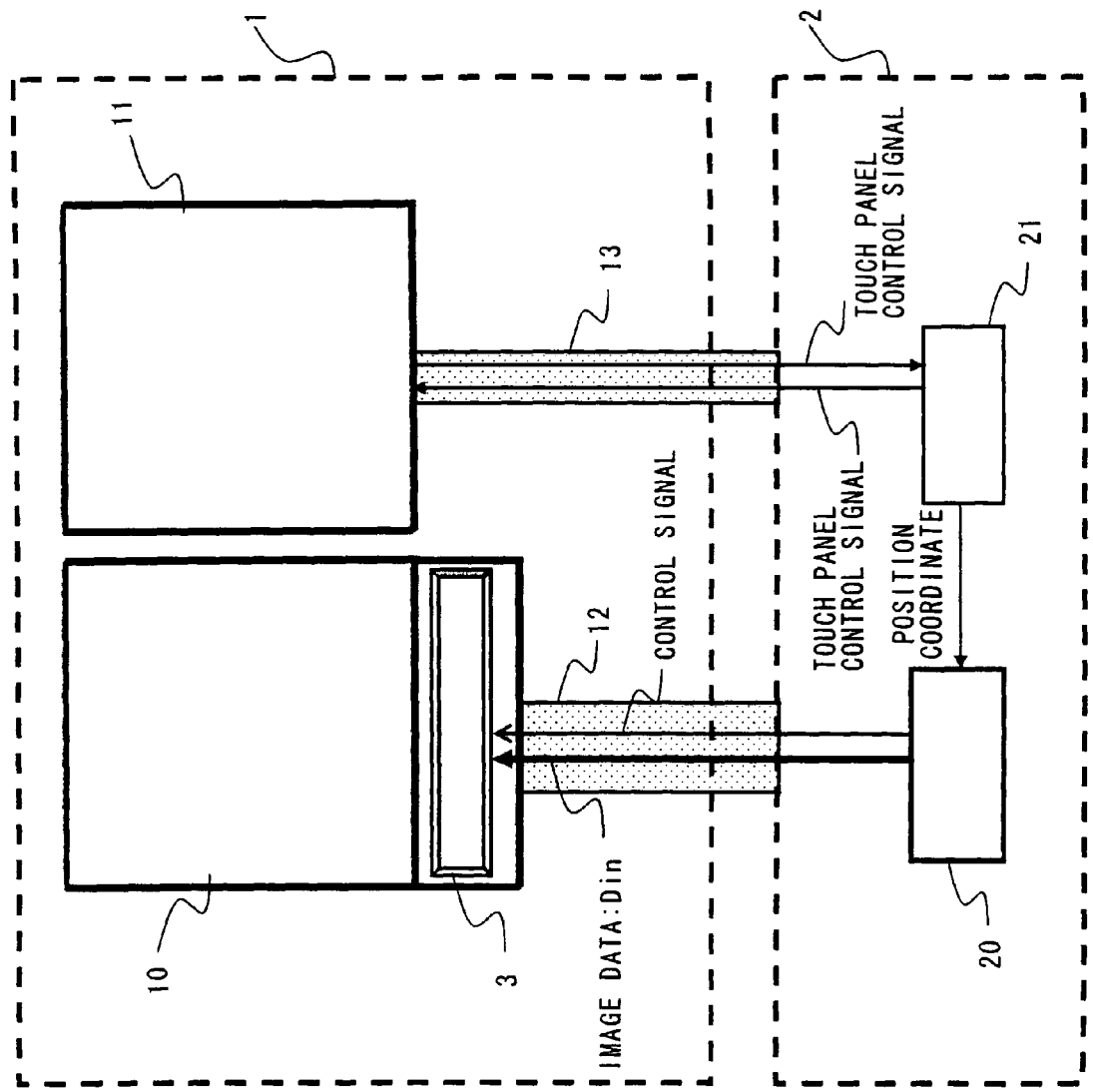
FIG. 17 is a diagram showing a configuration of a display device according to a related art.

FIG. 16 is a diagram showing still another processing flow of the controller driver 3 when the click operation holding signal indicates "1". FIG. 16 shows an example where the ratio α for use in the processing for enlarging the click image data and the processing for combining the click image data and the display memory storage image data is changed for each display frame timing signal Vsync.

When the display memory read coordinate (Xmem, Ymem) is equal to or greater than the position coordinate signal (Yt, Xt) and is equal to or smaller than a coordinate obtained by adding the maximum address (CYmax, CXmax)×(Vsync_count×Splus) of the click memory to the position coordinate signal (Yt, Xt), the cursor data output determination circuit 42 reads out the click image data Dclick and the image composition control signal α1 from the click memory 45, and outputs the image data Dcomp and αcomp after the enlargement processing and the α ratio conversion processing. That is, when Yt<=Ymem<=Yt+CYmax× (Vsync_count×Splus) and Xt<=Xmem<=Xt+CXmax× (Vsync_count×Splus) are satisfied, Dcursur_in=D_comp and α_in=α_comp are obtained.

Under the other conditions, Dcursur_in=0 and α_in=0 are fixed. Specifically, when Ymem<Yt or Yt+CYmax×(Vsync_ count×Splus)<Ymem and Xmem<Xt or Xt+CXmax× (Vsync_count×Splus)<Xmem are satisfied, Dcursur_in=0 and α_in=0 are obtained. Then, the composition processing circuit 50 generates the composite image data Dout to thereby obtain a display image in which the click image is gradually increased in size and gradually emerges frame by frame as shown in FIG. 16. By the above-mentioned processing, the operator of the touch panel 11 can recognize that the click operation has been carried out.

The predetermined display for recognizing the click operation is not limited to the examples shown in FIGS. 14 to 16, and can be changed as appropriate by setting.

As described above, according to an exemplary embodiment of the present invention, the touch panel controller is incorporated in the controller driver. This allows the controller driver to perform a touch panel control and send the position coordinate signal, which is calculated based on the touch panel information, to the CPU. Furthermore, the controller driver can output the composite image data, which is obtained by combining the image data stored in the display memory with the cursor image, to the display panel. Consequently, the CPU processing load can be reduced. Moreover, power consumption associated with the transfer of image data from the CPU to the controller driver can be reduced.

The first and second exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A controller driver that controls a display panel and a touch panel disposed on the display panel, the controller driver comprising:
   a display memory that stores image data to be displayed on the display panel;
   a touch panel control circuit that detects a touch panel signal from the touch panel;
   a cursor memory that stores cursor image data;
   a composition circuit that combines the cursor image data stored in the cursor memory with the image data stored in the display memory based on the touch panel signal, to generate composite image data;
   a click determination circuit that determines a click operation based on the touch panel signal;
   a click memory that stores click image data; and
   a conversion circuit that converts at least one of the cursor image data and the click image data,
   wherein, when the click determination circuit determines that no click operation is carried out, the conversion circuit generates data after a conversion processing is subjected to the cursor image data stored in the cursor memory,
   wherein, when the click determination circuit determines that the click operation is carried out, the conversion circuit generates data after another conversion processing, different from the conversion processing performed when no click operation is carried out, which is subjected to the click image data stored in the click memory, and
   wherein the composition circuit generates the composite image data by combining the data obtained after the conversion processing with the image data stored in the display memory.

2. The controller driver according to claim 1, wherein the cursor memory has a capacity smaller than a capacity of the display memory.

3. The controller driver according to claim 1, wherein the conversion circuit converts the cursor image data, and
   wherein the composition circuit combines data obtained after the conversion processing is subjected to the cursor image data stored in the cursor memory in the conversion circuit based on the touch panel signal, with the image data stored in the display memory, to generate the composite image data.

4. The controller driver according to claim 3, wherein the conversion circuit performs an enlargement processing on the cursor image data.

5. The controller driver according to claim 1, wherein the click image data is converted a plurality of times within a predetermined period of time in the conversion processing performed in the conversion circuit when the click operation is carried out.

6. The controller driver according to claim 5, wherein the predetermined period of time corresponds to two or more frames, and the click image data is converted in each frame period.

7. The controller driver according to claim 1, wherein the composition circuit comprises a blend circuit, and the conversion circuit changes a ratio for use in processing for combining at least one of the cursor image data and click image data with the image data stored in the display memory.

8. The controller driver according to claim 1, being configured as one chip.

9. A display device comprising:
   a controller driver as claimed in claim 1;
   a display panel driven by the controller driver; and
   a touch panel that is disposed on the display panel and controlled by the controller driver.

10. The controller driver according to claim 1, further comprising a signal line driver circuit that transmits a voltage to a pixel of the display panel based on the composite image data transmitted from the composition circuit.

11. The controller driver according to claim 1, wherein the touch panel circuit of the controller driver outputs a touch panel control signal for controlling the touch panel.

12. The controller driver according to claim 1, wherein the touch panel control circuit comprises the cursor memory.

13. The controller driver according to claim 1, wherein the touch panel control circuit comprises a touch panel control circuit that receives the touch panel signal from the touch panel and generates a position coordinate signal, and
   wherein the touch panel control circuit reads out the cursor image data stored in the cursor memory based on the position coordinate signal.

14. The controller driver according to claim 1, wherein, based on the touch panel signal, the touch panel control circuit generates a position coordinate signal that controls an image composition control signal that is sent to the composition circuit to combine the cursor image data stored in the cursor memory with the image data stored in the display memory.

15. The controller driver according to claim 1, further comprising:
   a cursor data output determination circuit that, based on the touch panel signal, outputs the cursor image data and an image composition control signal to the composition circuit to combine the cursor image data stored in the cursor memory with the image data stored in the display memory.

16. The controller driver according to claim 15, wherein, based on the touch panel signal, the touch panel control circuit generates a position coordinate signal, and
   wherein, upon receiving the position coordinate signal, the cursor data output determination circuit compares the position coordinate signal with a display memory read coordinate, and reads out the cursor image data and an image combining ratio data from the cursor memory in a response to a cursor memory read signal.

17. A control method for controlling a display panel and a touch panel disposed on the display panel, the control method comprising:
   storing image data to be displayed on the display panel into a display memory;
   detecting a touch panel signal from the touch panel;
   combining at least one of cursor image data and click image data with the image data stored in the display memory based on the touch panel signal, to generate composite image data;
   outputting the composite image data to the display panel;
   determining a click operation based on the touch panel signal;
   storing click image data; and
   converting said at least one of the cursor image data and the click image data,
   wherein, when it is determined that no click operation is carried out, data is generated after a conversion processing is subjected to the cursor image data stored in a cursor memory, wherein, when it is determined that the click operation is carried out, data generated after another conversion processing, different from the conversion processing performed when no click operation is carried out, is subjected to the click image data stored in a click memory, and wherein the composite image data is generated by combining data obtained after the conversion processing with the image data stored in the display memory.

18. The control method according to claim 17, further comprising:

converting the click image data when the click operation is carried out.

19. The control method according to claim 18, wherein the click image data is converted a plurality of times within a predetermined period of time.

* * * * *